(12) United States Patent
Katsuyama et al.

(10) Patent No.: US 11,416,206 B2
(45) Date of Patent: Aug. 16, 2022

(54) TOUCH INPUT DEVICE (71) Applicant: KABUSHIKI KAISHA TOKAI RIKA DENKI SEISAKUSHO, Aichi (JP)

(72) Inventors: Tatsushi Katsuyama, Aichi (JP); Takashi Nagao, Aichi (JP); Tetsuya Egawa, Aichi (JP); Takeyoshi Mori, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 260 days.

(21) Appl. No.: 16/644,143

(22) PCT Filed: Aug. 28, 2018

(86) PCT No.: PCT/JP2018/031794
§ 371 (c)(1),
(2) Date: Mar. 3, 2020

(87) PCT Pub. No.: WO2019/058896
PCT Pub. Date: Mar. 28, 2019

(65) Prior Publication Data
US 2020/0409648 A1  Dec. 31, 2020

(30) Foreign Application Priority Data

Sep. 19, 2017 (JP) .............................. JP2017-179097

(51) Int. Cl.
*G06F 3/16* (2006.01)
*B62D 1/04* (2006.01)
(Continued)

(52) U.S. Cl.
CPC ............... *G06F 3/16* (2013.01); *B62D 1/046* (2013.01); *G06F 3/016* (2013.01); *G06F 3/044* (2013.01);
(Continued)

(58) Field of Classification Search
CPC . G06F 3/16; G06F 3/016; G06F 2/044; B62D 1/046; H04R 1/028; H04R 1/403;
(Continued)

(56) References Cited

U.S. PATENT DOCUMENTS

2002/0149561 A1  10/2002  Fukumoto et al.
2004/0178996 A1  9/2004  Kurashima et al.
(Continued)

FOREIGN PATENT DOCUMENTS

JP  2002-149312 A  5/2002
JP  2004-272690 A  9/2004
(Continued)

*Primary Examiner* — Andrew L Sniezek
(74) *Attorney, Agent, or Firm* — Roberts Calderon Safran & Cole P.C.

(57) ABSTRACT

A touch input device includes a touch input part that is installed on a vehicle and includes a tabular panel to be touch-operated and an actuator causing a vibration of the panel; and a control unit that performs at least one of a first control and a second control, the first control driving the actuator such that the panel vibrates in response to touch operations, and the second control driving the actuator such that the panel vibrates at an audible band. The touch input device is positioned such that a directivity of a sound emitted from the panel is increased toward an ear of an occupant of the vehicle.

10 Claims, 5 Drawing Sheets

(51) Int. Cl.
*G06F 3/01* (2006.01)
*G06F 3/044* (2006.01)
*H04R 1/02* (2006.01)
*H04R 1/40* (2006.01)
*H04R 3/12* (2006.01)
*H04R 5/02* (2006.01)
*H04S 1/00* (2006.01)
*H04S 7/00* (2006.01)
*H04R 17/00* (2006.01)

(52) U.S. Cl.
CPC ............ *H04R 1/028* (2013.01); *H04R 1/403* (2013.01); *H04R 3/12* (2013.01); *H04R 5/02* (2013.01); *H04S 1/007* (2013.01); *H04S 7/303* (2013.01); *H04R 17/00* (2013.01); *H04R 2499/13* (2013.01); *H04R 2499/15* (2013.01)

(58) Field of Classification Search
CPC . H04R 3/12; H04R 5/02; H04R 17/00; H04R 2499/13; H04R 2499/15; H04S 1/007; H04S 7/303
See application file for complete search history.

(56) References Cited

U.S. PATENT DOCUMENTS

2011/0241850 A1* 10/2011 Bosch ................ H03K 17/9625
340/384.6
2014/0062872 A1* 3/2014 Tanaka ................ G06F 3/03547
345/157

FOREIGN PATENT DOCUMENTS

JP 2014-102658 A 6/2014
JP 2015-018425 A 1/2015

* cited by examiner

TOUCH INPUT DEVICE

CROSS-REFERENCE TO RELATED APPLICATIONS

The present application is a U.S. National Phase of PCT/JP2018/031794 filed on Aug. 28, 2018 claiming priority to Japanese Patent Application No. 2017-179097 filed on Sep. 19, 2017. The disclosure of the PCT Application is hereby incorporated by reference into the present Application.

TECHNICAL FIELD

The invention relates to a touch input device.

BACKGROUND ART

A technique used for a drive control device for touch panel is disclosed in which a signal in the audible band is used as a drive signal for an actuator causing vibration of a touch panel so that a haptic function is exerted and also audible sound is produced (see, e.g., Patent Literature 1). In this drive control device for touch panel, the surface of the touch panel is covered with a transparent protective panel which is supported on the edge portion of a case, and a display and the touch panel are arranged in a housing portion of the case. The protective panel is formed by bonding a glass substrate to a resin substrate in such a manner that piezoelectric vibration elements are housed in recesses provided on a bonding surface of the resin substrate which is then bonded to the glass substrate. When the piezoelectric vibration elements vibrate, vibration is transmitted as a surface acoustic wave to the surface of the protective panel and achieves a haptic function.

CITATION LIST

Patent Literature

Patent Literature 1: JP 2015/18425 A

SUMMARY OF INVENTION

Technical Problem

In the technique disclosed in Patent Literature 1, the drive signal for the actuator is a signal in the audible band but the arrangement of the touch panel is not mentioned therein.

Thus, a problem may arise that it is not possible to generate three-dimensional audio images by the touch panel.

It is an object of the invention to provide a touch input device which can generate the three-dimensional audio images.

Solution to Problem

According to an embodiment of the invention, a touch input device may be configured as defined by [1] to [10] below.

[1] A touch input device, comprising: a touch input part that is installed on a vehicle and comprises a tabular panel to be touch-operated and an actuator causing a vibration of the panel; and a control unit that performs at least one of a first control and a second control, the first control driving the actuator such that the panel vibrates in response to touch operations, and the second control driving the actuator such that the panel vibrates at an audible band, wherein the touch input device is positioned such that a directivity of a sound emitted from the panel is increased toward an ear of an occupant of the vehicle.

[2] The touch input device according to [1], wherein the touch input part is arranged on a steering wheel of the vehicle.

[3] The touch input device according to [1] or [2], wherein as the second control, the control unit drives the actuator so that a warning tone or warning sound is output from the panel.

[4] The touch input device according to [3], wherein the control unit outputs a sine-wave drive signal with a frequency in the audible band to the actuator so that the warning tone is output from the panel.

[5] The touch input device according to [3], wherein the control unit outputs a drive signal based on a sound signal in the audible band, to the actuator so that the warning sound is output from the panel.

[6] The touch input device according to any one of [1] to [5], wherein the number of the touch input parts provided on the vehicle is at least two, and the control unit performs, as a part of the second control, control of properties of sound output from each panel so that a three-dimensional audio image produced by sounds output from the panels is maintained.

[7] The touch input device according to [6], wherein the at least two touch input parts are arranged across a center line passing through the center of a seat or the steering wheel in the vehicle.

[8] The touch input device according to [6] or [7], wherein one of the at least two touch input parts which is located on a right side with respect to the center line is positioned to increase the directivity toward a right ear of the occupant, and wherein one of the at least two touch input parts which is located on a left side with respect to the center line is positioned to increase the directivity toward a left ear of the occupant.

[9] The touch input device according to any one of [6] to [8], wherein the control unit comprises a phase shift means and an adding means, wherein the phase shift means performs a phase-delay process to delay a phase of the sound signal of a right channel corresponding to the one of the at least two touch input parts located on the right side with respect to the center line and to the sound signal of a left channel corresponding to the one of the at least two touch input parts located on the left side with respect to the center line, and wherein the adding means outputs a drive signal of the right and left channels respectively by adding the sound signal of the right channel to the sound signal of the left channel phase-delayed by the phase shift means and the sound signal of the left channel to the sound signal of the right channel phase-delayed by the phase shift means.

[10] The touch input device according to [9], wherein the control unit sets respective phase differences in the phase shift means so that, at the right ear of the occupant, a synthetic sound of sound based on the sound signal of the right channel and sound based on the sound signal of the right channel phase-delayed by the phase shift means is maximized and a synthetic sound of sound based on the sound signal of the left channel and sound based on the sound signal of the left channel phase-delayed by the phase shift means is minimized, and at the left ear of the occupant, a synthetic sound of sound based on the sound signal of the left channel and sound based on the sound signal of the left channel phase-delayed by the phase shift means is maximized and a synthetic sound of sound based on the sound signal of the right channel and sound based on the sound signal of the right channel phase-delayed by the phase shift means is minimized.

Advantageous Effects of Invention

According to an embodiment of the invention, it is possible to provide a touch input device which can generate the three-dimensional audio images.

DESCRIPTION OF EMBODIMENTS

Embodiment of the Invention

A touch input device 1 in the embodiment of the invention has touch input parts 30, 40 that are installed in a vehicle 5 and are provided with tabular panels 31, 41 to be touch-operated and actuators 32, 42 causing vibration of the panels 31, 41, and a control unit 100 that performs at least one of first control and second control, the first control driving the actuators 32, 42 such that the panels 31, 41 vibrate in response to touch operations, and the second control driving the actuators 32, 42 such that the panels 31, 41 vibrate in the audible band, wherein the touch input device 1 is positioned such that a directivity of a sound emitted from the panels 31, 41 is increased toward the ears 21, 22 of a driver 20 of the vehicle 5.

Figure 1A:
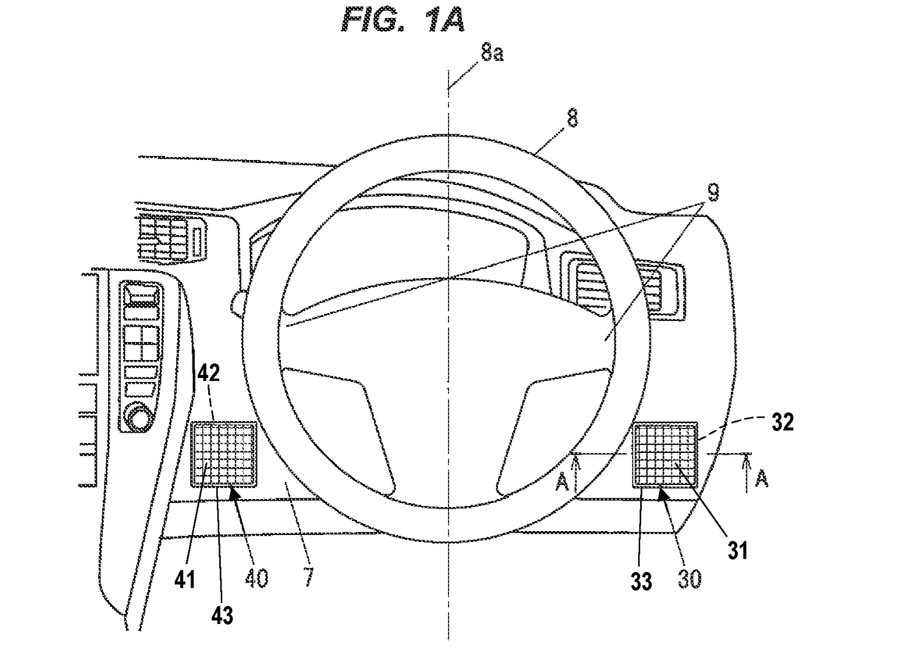
FIG. 1A is a front view showing a touch input device in an embodiment mounted on an instrument panel of a vehicle when viewing the instrument panel from a driver.
Figure 1B:
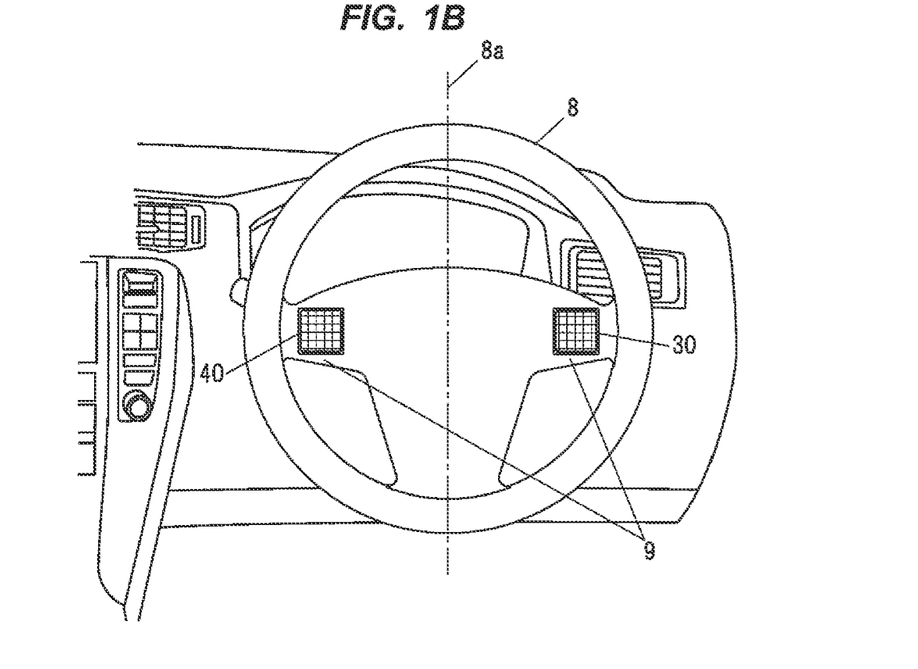
FIG. 1B is a front view showing the touch input device in the embodiment mounted on a steering wheel of the vehicle when viewing the steering wheel from the driver.

The touch input parts 30, 40 may be attached to, e.g., an instrument panel 7 of the vehicle 5 as shown in FIG. 1A, or may be attached to a steering wheel 8 as shown in FIG. 1B. One or two or more touch input parts are provided on the vehicle 5. In the present embodiment, an example in which the two touch input parts 30, 40 are symmetrically arranged across a center line 8a of the steering wheel 8 as shown in FIG. 1B will be described.

In addition, in the present embodiment, an example in which the occupant is the driver 20 will be described.

(Touch Input Parts 30 and 40)

Figure 2:
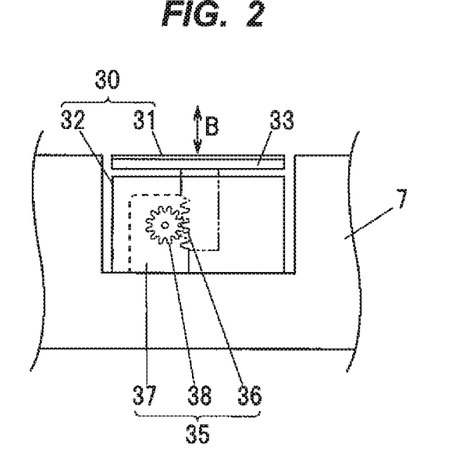
FIG. 2 is a cross sectional view showing the touch input device taken along a line A-A in FIG. 1A.

As shown in FIG. 2, the touch input parts 30, 40 are composed of the tabular panels 31, 41 and the actuators 32, 42 which cause vibration of the panels. The tabular panels 31, 41 are attached to panel main bodies 33, 43.

The panels 31, 41 are arranged on the front surface side of the panel main bodies 33, 43 and are portions to be touch-operated. The panels 31, 41 act as touch portions which provide tactile sensation from the actuators 32, 42 side to the finger, etc., performing a touch operation, and also act as sound sources which produce sound by being vibrated in the audible band by the actuators 32,42 via the panel main bodies 33, 43. The entire panels 31, 41 may be fixed to the panel main bodies 33, 43 so that the above-described functions can be exerted, or portions of the panels 31, 41 such as peripheries may be fixed to the panel main bodies 33, 43 so as to be able to easily act as sound sources.

The touch input parts 30, 40 are provided with, e.g., capacitive touch detection parts (illustration omitted) on the panel main bodies 33, 43 under the panels 31, 41. The touch detection part has, e.g., drive electrodes and detection electrodes two-dimensionally arranged in a matrix in the X and Y directions within the range of the panel 31 or 41 and detects a touched position based on a change in mutual capacitance caused by approach or contact of a finger, etc. It is also possible to use other types of touch detection such as self-capacitance type.

(Actuators 32, 42)

Any drive mechanism capable of moving the panels 31, 41 in the vertical direction B by driving the panel main bodies 33, 43 can be used as the actuators 32, 42. As an example of the actuators 32, 42, it is possible to use, e.g., a drive mechanism 35 in which a rack gear 36 on the touch input part 30 side engages a pinion gear 38 on a motor 37 side to translate rotational motion of the motor 37 into vertical motion of the panels 31, 41, as shown in FIG. 2. Since the drive mechanism 35 drives in two direction to rotationally drive the motor 37 and to vertically drive the panel main body 33, a backlash between the rack gear 36 and the pinion gear 38 is preferably reduced by a known backlash removal mechanism such as addendum modification of gears.

The actuators 32, 42 are not limited to the above-mentioned drive mechanism. For example, the configuration may be such that piezoelectric elements supporting the panel main bodies 33, 43 are provided on the drive mechanism side so that the panels 31, 41 can be driven in the vertical direction B by driving the piezoelectric elements. A piezo element can be used as the piezoelectric element and it is possible to use a stacked or bimorph piezoelectric element, etc., which moves in the vertical direction B upon application of voltage.

(Arrangement of the Touch Input Parts)

As shown in FIG. 1B, the two touch input parts 30, 40 are symmetrically arranged across the center line 8a of the steering wheel 8. The touch input parts 30, 40 can output sound in a predetermined frequency band and can output, e.g., warning tones or warning sound, etc., based on control from the vehicle side.

As shown in FIG. 1B, the touch input parts 30, 40 can be respectively provided on spokes 9 of the steering wheel 8. That is, it is possible to arrange the touch input part 30 on the right spoke 9 and the touch input part 40 on the left spoke 9, with the center line 8a of the steering wheel 8 in-between. The center line 8a of the steering wheel 8 here is a line passing through the center of the steering wheel 8 when the steering angle is zero, i.e., the steering wheel is not manipulated. A right sound signal S1 and a left sound signal S2 to the touch input parts 30, 40 can be input from the vehicle main body side via, e.g., a steering roll connector (illustration omitted).

Figure 3:
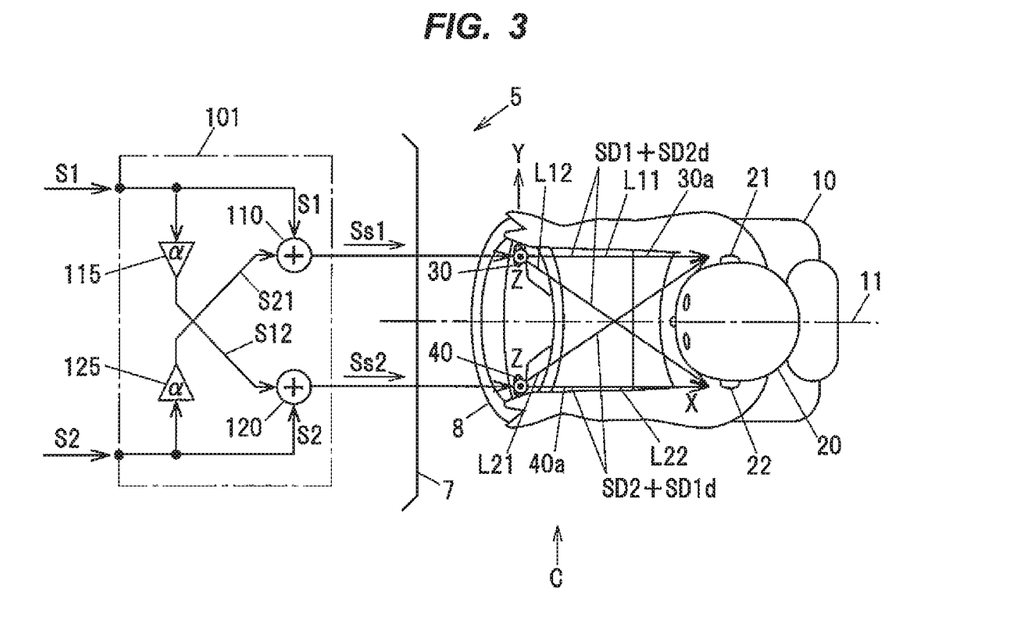
FIG. 3 is a top view showing an arrangement example of the touch input device when viewing the vehicle from above, in the case that the touch input device in the embodiment is mounted on the steering wheel of the vehicle.

In FIG. 3, a direction from the touch input part to the ears of the driver 20 and from the front toward the rear of the vehicle 5 is defined as the X direction, a width direction of the vehicle 5 is defined as the Y direction, and a vertical direction of the vehicle 5 as the cross product of the X axis and the Y axis is defined as the Z direction. As shown in FIG. 3, the touch input part 30 is positioned so as to increase in directivity toward the right ear 21 of the driver 20. Likewise, the touch input part 40 is positioned so as to increase in directivity toward the left ear 22 of the driver 20. That is, by mounting the touch input parts 30, 40 on the steering wheel 8, an output axis 30a of the touch input part 30 can be oriented in the direction toward the right ear 21 of the driver 20, and an output axis 40a of the touch input part 40 can be oriented in the direction toward the left ear 22 of the driver 20.

Figure 4:
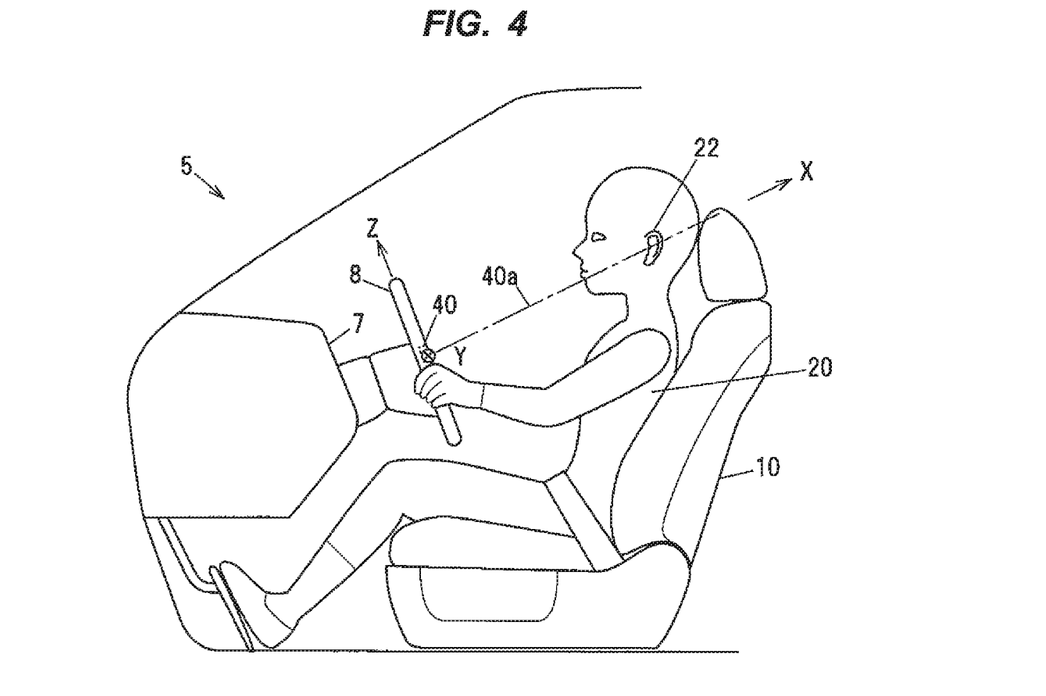
FIG. 4 is a side view when the touch input device is viewed in the direction C in FIG. 3.

Meanwhile, as shown in FIG. 4, the touch input part 40 is arranged to face slightly upward and toward the ears of the driver 20. Thus, the X axis and the Z axis are slightly rotated about the Y axis, as shown in FIG. 4.

As shown in FIG. 4, since the touch input parts 30, 40 are mounted on the steering wheel 8, the touch input part 40 is arranged to face slightly upward (the X axis direction) so that the output axis 40a of the touch input part 40 is oriented in the direction toward the left ear 22 of the driver 20. The touch input part 30 is also arranged to face slightly upward (the X axis direction) in the same manner. In this arrangement, the directivity of the two touch input parts 30, 40 is increased toward the ears 21, 22 of the occupant. Thus, the directivity of sounds emitted from the panels 31, 41 can be increased toward the ears 21, 22 of the driver 20 of the vehicle 5.

(Control Unit 100)

Figure 5:
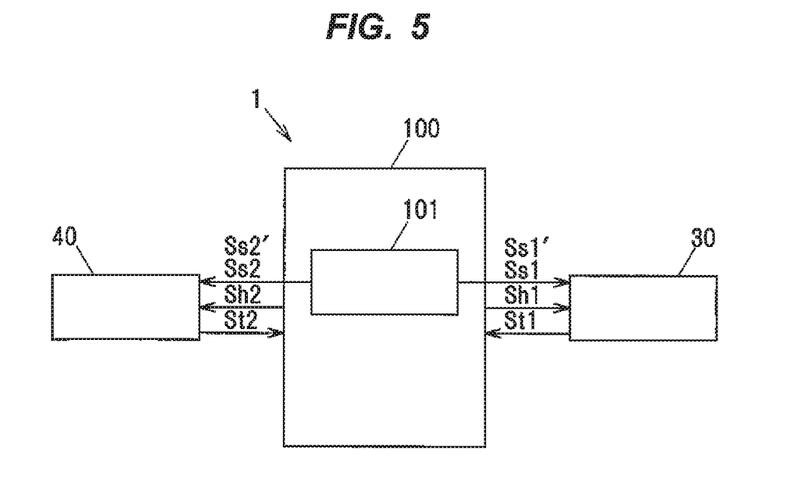
FIG. 5 is a block diagram illustrating a configuration of the touch input device in the embodiment.

The control unit 100 is provided with, e.g., a microcomputer composed of a CPU (Central Processing Unit) performing predetermined calculation and processing, etc., according to a stored program, a RAM (Random Access Memory) and a ROM (Read Only Memory) as semiconductor memories, etc. The ROM stores, e.g., a program for operation of the control unit 100 and various parameters, etc. The control unit 100 is also provided with a sound image controller 101 to control sound image localization.

As shown in FIG. 5, the touch input parts 30, 40 are connected to the control unit 100. Touch signals St1 and St2 are input from the touch input parts 30, 40. Then, in response to the touch signals St1 and St2, tactile sensation presentation signals Sh1, Sh2 to provide tactile sensation are output to the actuators 32, 42 of the touch input parts 30, 40. In addition, sound signals Ss1, Ss2 to output warning tones or warning sound, etc., are also output to the actuators 32, 42 of the switch input parts 30, 40 via the sound image controller 101.

(Tactile Sensation Presentation Control by the Control Unit 100)

As the first control, the control unit 100 drives the actuators 32, 42 so that the panels 31, 41 vibrate in response to a touch operation. That is, based on the touch signals St1 and St2, tactile sensation can be provided by vibration, etc., to an operator operating the panels 31, 41. When a touch operation is performed, the control unit 100 outputs the tactile sensation presentation signals Sh1, Sh2 to the actuators 32, 42 to, e.g., thrust the panels 31, 41 upward once or several times with a predetermined force, thereby providing tactile sensation. Alternatively, tactile sensation can be provided by vibrating at a predetermined cycle.

(Sound Image Localization Control by the Control Unit 100)

As the second control, the control unit 100 drives the actuators 32, 42 so that the panels 31, 41 vibrate in the audible band. In addition, as a part of the second control, the control unit 100 controls properties of sound output from each of the panels 31, 41 so that a three-dimensional audio image produced by sounds output from the panels 31, 41 is maintained. This control is performed as follows.

As shown in FIG. 3, a drive part 110 for driving the touch input part 30 (the actuator 32) and a drive part 120 for driving the touch input part 40 (the actuator 42) are provided in the sound image controller 101. The drive part 110 drives the touch input part 30 by amplifying the right sound drive signal Ss1 obtained by adding the right sound signal S1 to a phase shifted signal S21 of the left sound signal S2. Likewise, the drive part 120 drives the touch input part 40 by amplifying the left sound drive signal Ss2 obtained by adding the left sound signal S2 to a phase shifted signal S12 of the right sound signal S1. Thus, the panel 31 of the touch input part 30 vibrates, resulting in output of sound of the right channel based on the right sound drive signal Ss1, and also the panel 31 of the touch input part 40 vibrates, resulting in output of sound of the left channel based on the left sound drive signal Ss2.

A phase shift circuit 115 shifts (delays) the phase of the right sound signal S1 and then outputs the phase shifted signal S12 to the drive part 120. For the phase shift, a phase difference a between the right sound signal S1 and the phase shifted signal S12 can be appropriately set.

Likewise, a phase shift circuit 125 shifts (delays) the phase of the left sound signal S2 and then outputs the phase shifted signal S21 to the drive part 110. For the phase shift, a phase difference a between the left sound signal S2 and the phase shifted signal S21 can be appropriately set. In this regard, the phase difference a here is used when the touch input parts 30, 40 are symmetrically arranged across a center line 11 of a seat 10, and the phase difference can be different between the phase shift circuit 115 and the phase shift circuit 125 when, e.g., the touch input parts 30, 40 are asymmetrically arranged across the center line 11 of the seat 10.

Gains of the drive parts 110, 120 and the phase shift circuits 115, 125 can be adjusted respectively. Thus, as shown in FIG. 3, it is possible to adjust an addition ratio of the right sound signal S1 to the phase shifted signal S21 in the drive part 110 and an addition ratio of the left sound signal S2 to the phase shifted signal S12 in the drive part 120. In addition, it is possible to adjust sound pressure output from the panel 31 of the touch input part 30 and from the panel 41 of the touch input part 40 and it is also possible to adjust the balance of stereo sound between left and right.

The control unit 100 controls properties of sound output from each panel so that a three-dimensional audio image produced by sounds output from the two panels 31, 41 is maintained.

Sound SD1 of the right channel and phase-shifted sound SD2d of the left channel, which are output from the touch input part 30, and sound SD2 of the left channel and phase-shifted sound SD1d of the right channel, which are output from the touch input part 40, reach the right ear 21.

The sound of the right channel reaching the right ear 21 is the sound SD1 of the right channel and the phase-shifted sound SD1d of the right channel.

The sound of the left channel reaching the right ear 21 is the sound SD2 of the left channel and the phase-shifted sound SD2d of the left channel.

Based on this, the control unit 100 performs control so that a synthetic sound of the sound SD1 of the right channel and the phase-shifted sound SD1d of the right channel is maximized and a synthetic sound of the sound SD2 of the left channel and the phase-shifted sound SD2$d$ of the left channel is minimized.

In order that the synthetic sound of the sound SD1 of the right channel and the phase-shifted sound SD1$d$ of the right channel is maximized at the right ear 21, for example, the control unit 100 sets the phase difference a so that the phase difference between the sound SD1 travelling a distance L11 and the sound SD1$d$ travelling a distance L21 is $2\pi n$ (n=0, 1, 2 . . . ). Here, the distance L11 is a distance from the touch input part 30 to the right ear 21, and the distance L21 is a distance from the touch input part 40 to the right ear 21.

In order that the synthetic sound of the sound SD2 of the left channel and the phase-shifted sound SD2$d$ of the left channel is minimized at the right ear 21, the phase difference a is set so that the phase difference between the sound SD2 travelling the distance L21 and the sound SD2$d$ travelling the distance L11 is $\pi n$ (n=0, 1, 2 . . . ).

At the position of the right ear 21, the sound SD1 of the right channel and the sound SD2 of the left channel cancel each other out or crosstalk therebetween is reduced by the above-described setting in which the synthetic sound of the sound SD2 of the left channel and the phase-shifted sound SD2$d$ of the left channel is minimized at the right ear 21.

Likewise, the sound SD2 of the left channel and the phase-shifted sound SD1$d$ of the right channel, which are output from the touch input part 40, and the sound SD1 of the right channel and the phase-shifted sound SD2$d$ of the left channel, which are output from the touch input part 30, reach the left ear 22.

The sound of the left channel reaching the left ear 22 is the sound SD2 of the left channel and the phase-shifted sound SD2$d$ of the left channel.

The sound of the right channel reaching the left ear 22 is the sound SD1 of the right channel and the phase-shifted sound SD1$d$ of the right channel.

Based on this, the control unit 100 performs control so that a synthetic sound of the sound SD2 of the left channel and the phase-shifted sound SD2$d$ of the left channel is maximized and a synthetic sound of the sound SD1 of the right channel and the phase-shifted sound SD1$d$ of the right channel is minimized. In order that the synthetic sound of the sound SD2 of the left channel and the phase-shifted sound SD2$d$ of the left channel is maximized at the left ear 22, for example, the control unit 100 sets the phase difference a so that the phase difference between the sound SD2 travelling a distance L22 and the sound SD2$d$ travelling a distance L12 is $2\pi n$ (n=0, 1, 2 . . . ). Here, the distance L22 is a distance from the touch input part 40 to the left ear 22, and the distance L12 is a distance from the touch input part 30 to the left ear 22.

In order that the synthetic sound of the sound SD1 of the right channel and the phase-shifted sound SD1$d$ of the right channel is minimized at the left ear 22, the phase difference a is set so that the phase difference between the sound SD1 travelling the distance L12 and the sound SD1$d$ travelling the distance L22 is $\pi n$ (n=0, 1, 2 . . . ).

At the position of the left ear 22, the sound SD2 of the left channel and the sound SD1 of the right channel cancel each other out or crosstalk therebetween is reduced by the above-described setting in which the synthetic sound of the sound SD1 of the right channel and the phase-shifted sound SD1$d$ of the right channel is minimized at the left ear 22.

Due to the phase shift controlled by the control unit 100, it is possible to allow sound to be localized at the ears and it is also possible to perform control so that a three-dimensional audio image produced by sounds output from the two touch input parts 30, 40 is maintained.

(Operation Example of the Touch Input Parts 30 and 40)

Figure 6:
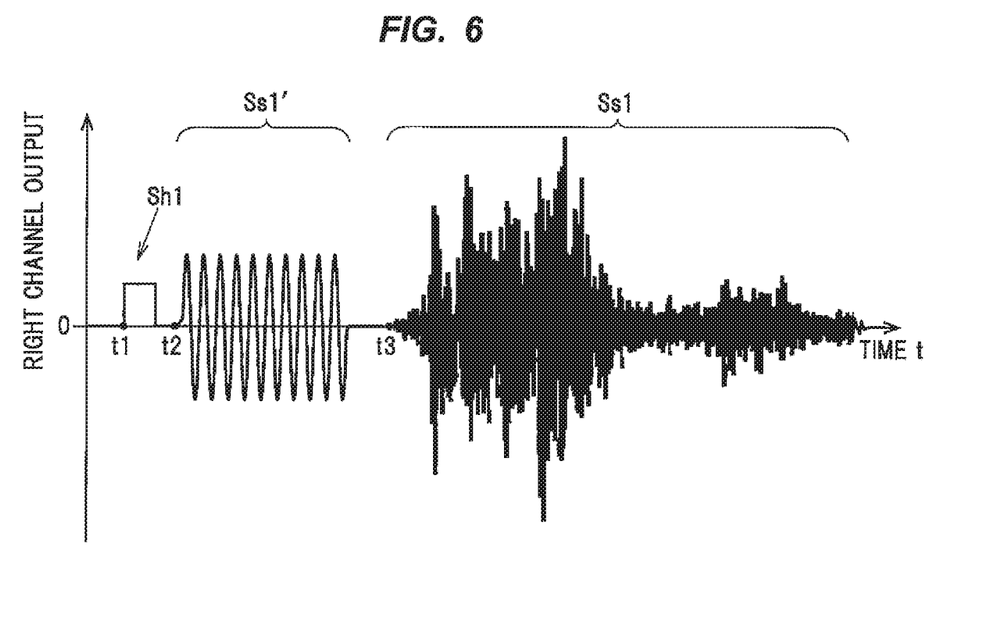
FIG. 6 shows a waveform example of a drive signal of a right channel for driving a panel, wherein a drive signal Sh1 is to provide tactile sensation by causing vibration of the panel in response to a touch operation, a drive signal Ss1 is to produce a beep from the panel, and a drive signal Ss1' is to produce a sound from the panel.

The operation of the touch input parts 30, 40 will be described using a waveform example of the drive signal of the right channel shown in FIG. 6 which is a signal for driving the panel. The control unit 100 outputs, e.g., the drive signal Sh1 for tactile sensation presentation to the actuator 32 at time t1 in response to a touch operation and thereby makes the panel 31 vibrate. Tactile sensation is presented by, e.g., motion of thrusting the panel 31 upward by a single pulse, as shown in FIG. 6.

Then, at time t2, a sine wave with a frequency in the audible band is generated as the drive signal Ss1' and is output to the actuator 32, thereby vibrating the panel 31. This produces a beep as a warning tone which provides a warning announcement to the driver 20. The touch input part 30 acts as a sound source (speaker) for producing warning sound.

Then, at time t3, a sound signal in the audible band is generated as the drive signal Ss and is output to the actuator 32 via the sound image controller 101. A sound signal in the audible band, which corresponds to the drive signal Ss in a stereo manner, is also generated as the drive signal Ss2 of the left channel and is output to the actuator 42 via the sound image controller 101. Thus, the panels 31, 41 can vibrate in response to the sound signals. The touch input parts 30, 40 can act as sound sources (speakers) for generating warning sound and allow for sound localization control so that a three-dimensional audio image is maintained.

The present embodiment is not limited to the use of two touch input parts and is also applicable to when not less than three touch input parts are arranged across the center line 11 of the seat 10 or the center line 8$a$ of the steering wheel. That is, taking into consideration the distance from the touch input part to the ear of the occupant and the phase difference for the sound output from each touch input port, the phase difference is set so that the synthetic sounds are maximized/minimized at the right ear and the left ear respectively, and this cancels out sounds of the right and left channel and reduces crosstalk therebetween. Thus, even in case that three or more touch input parts are provided, it is possible to allow sound to be localized at the ears and it is also possible to perform control so that a three-dimensional audio image produced by sounds output from the three or more touch input parts is maintained.

Effects of the Embodiment

The following effects are obtained in the embodiment of the invention.

(1) The touch input device 1 in the embodiment of the invention has the touch input parts 30, 40 that are installed in the vehicle 5 and are provided with the tabular panels 31, 41 to be touch-operated and the actuators 32, 42 causing vibration of the panels 31, 41, and the control unit 100 that performs at least one of first control and second control, the first control being performed to drive the actuators 32, 42 such that the panels 31, 41 vibrate in response to touch operations, and the second control being performed to drive the actuators 32, 42 such that the panels 31, 41 vibrate in the audible band, wherein the touch input device 1 is positioned such that a directivity of a sound emitted from the panels 31, 41 is increased toward the ears 21, 22 of a driver 20 of the vehicle 5. As a result, the touch input parts act to provide tactile sensation in response to the touch operation under the first control, and also act as sound sources (speakers) for generating sound by being vibrated in the audible band under the second control.

(2) The touch input part can be mounted on, e.g., an instrument panel or a steering wheel, etc., of the vehicle main body. Therefore, it is not necessary to provide a space for mounting a speaker for producing sound and this contributes to size reduction.

(3) Since the actuator provided on the touch input part to provide tactile sensation can be also used to produce tone or sound, the touch input device 1 can have a speaker function without increasing the cost.

Although some embodiments of the invention have been described above, the embodiments are merely exemplary and the invention according to claims is not to be limited thereto. These new embodiments may be implemented in various other forms, and various omissions, substitutions and changes, etc., can be made without departing from the gist of the invention. In addition, all combinations of the features described in these embodiments are not necessary to solve the problem of the invention. Further, these embodiments are included within the scope and gist of the invention and also within the invention described in the claims and the equivalency thereof.

REFERENCE SIGNS LIST

1 TOUCH INPUT DEVICE
5 VEHICLE
8 STEERING WHEEL
8a CENTER LINE
10 SEAT
11 CENTER LINE
20 DRIVER
21 RIGHT EAR
22 LEFT EAR
30 TOUCH INPUT PART
31 PANEL
32 ACTUATOR
33 PANEL MAIN BODY
40 TOUCH INPUT PART
41 PANEL
42 ACTUATOR
100 CONTROL UNIT
110 DRIVE PART
115 PHASE SHIFT CIRCUIT
120 DRIVE PART
125 PHASE SHIFT CIRCUIT

The invention claimed is:

1. A touch input device, comprising:
at least two touch input parts that are installed on a vehicle, each touch input part comprising a tabular panel to be touch-operated and an actuator causing a vibration of the panel; and
a control unit that performs at least one of a first control and a second control, the first control driving each actuator such that the panels vibrate in response to touch operations, and the second control driving each actuator such that the panels vibrate at an audible band,
wherein, due to the positioning of the touch input device, and control of a phase shift by the control unit of each audible band generated by the panels, sound emitted from the panels of the at least two touch input parts is localized toward an ear of an occupant of the vehicle to allow a three-dimensional audio image to be maintained.

2. The touch input device according to claim 1, wherein the touch input part is arranged on a steering wheel of the vehicle.

3. The touch input device according to claim 1, wherein as the second control, the control unit drives the actuator so that a warning tone or warning sound is output from the panel.

4. The touch input device according to claim 3, wherein the control unit outputs a sine-wave drive signal with a frequency in the audible band to the actuator so that the warning tone is output from the panel.

5. The touch input device according to claim 3, wherein the control unit outputs a drive signal based on a sound signal in the audible band, to the actuator so that the warning sound is output from the panel.

6. The touch input device according to claim 1, wherein the control unit performs, as a part of the second control, control of properties of sound output from each panel in addition to a phase shift so that a three-dimensional audio image produced by sounds output from the panels is maintained.

7. The touch input device according to claim 6, wherein the at least two touch input parts are arranged across a center line passing through the center of a seat or the steering wheel in the vehicle.

8. The touch input device according to claim 6,
wherein one of the at least two touch input parts which is located on a right side with respect to the center line is positioned to increase the directivity toward a right ear of the occupant, and
wherein one of the at least two touch input parts which is located on a left side with respect to the center line is positioned to increase the directivity toward a left ear of the occupant.

9. The touch input device according to claim 6,
wherein the control unit comprises a phase shift means and an adding means,
wherein the phase shift means performs a phase-delay process to delay a phase of the sound signal of a right channel corresponding to the one of the at least two touch input parts located on the right side with respect to the center line and to the sound signal of a left channel corresponding to the one of the at least two touch input parts located on the left side with respect to the center line, and
wherein the adding means outputs a drive signal of the right and left channels respectively by adding the sound signal of the right channel to the sound signal of the left channel phase-delayed by the phase shift means and the sound signal of the left channel to the sound signal of the right channel phase-delayed by the phase shift means.

10. The touch input device according to claim 9,
wherein the control unit sets respective phase differences in the phase shift means so that, at the right ear of the occupant, a synthetic sound of sound based on the sound signal of the right channel and sound based on the sound signal of the right channel phase-delayed by the phase shift means is maximized and a synthetic sound of sound based on the sound signal of the left channel and sound based on the sound signal of the left channel phase-delayed by the phase shift means is minimized, and at the left ear of the occupant, a synthetic sound of sound based on the sound signal of the left channel and sound based on the sound signal of the left channel phase-delayed by the phase shift means is maximized and a synthetic sound of sound based on the sound signal of the right channel and sound based on the sound signal of the right channel phase-delayed by the phase shift means is minimized.

\* \* \* \* \*